July 21, 1959 G. H. FORSYTH ET AL 2,895,512
PIPE LINES
Filed Oct. 17, 1955
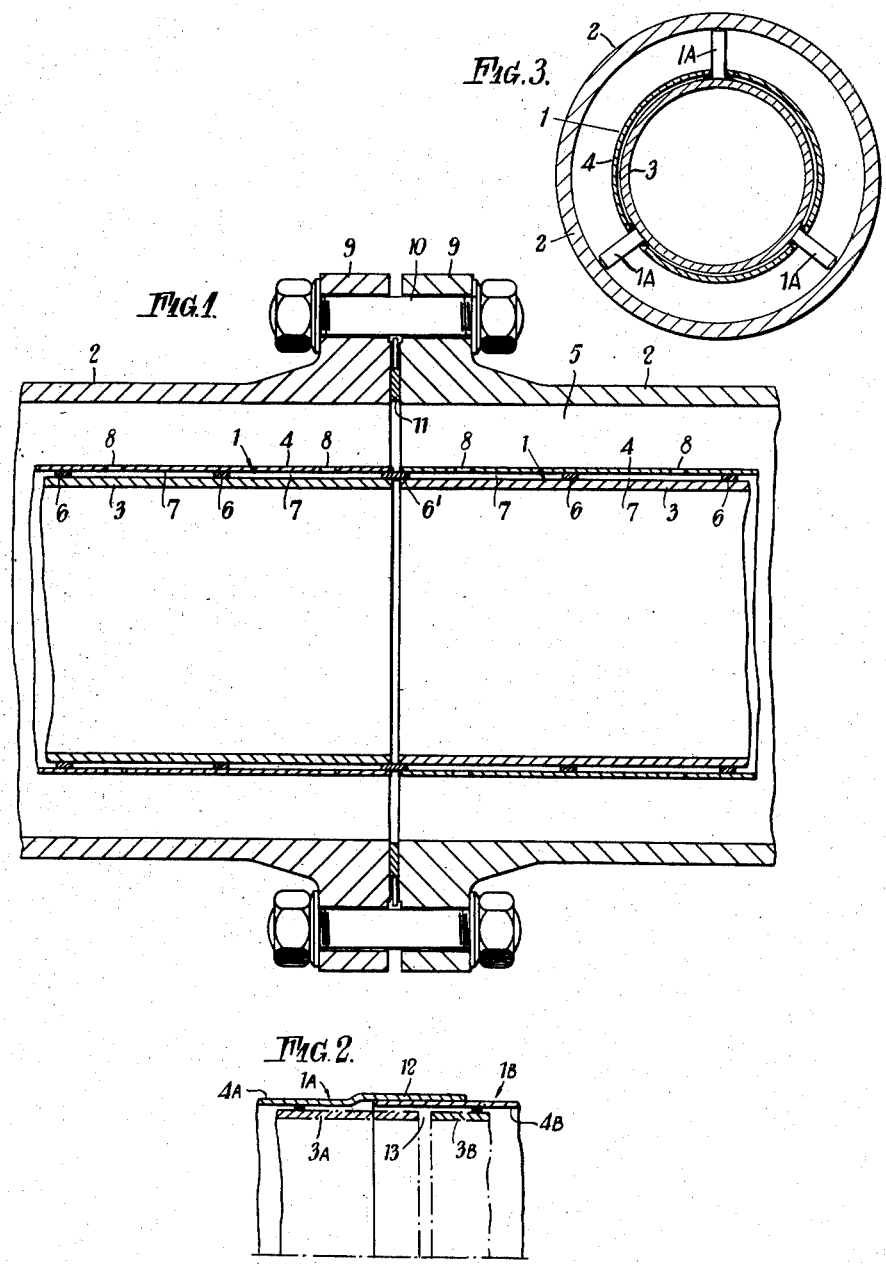

United States Patent Office

2,895,512
Patented July 21, 1959

2,895,512

PIPE LINES

George Howard Forsyth, George Wood, and James Stevens, London, England, assignors to Vickers-Armstrongs (Engineers) Limited, London, England, a British company Application October 17, 1955, Serial No. 540,856

Claims priority, application Great Britain October 29, 1954

6 Claims. (Cl. 138—87)

This invention relates to pipelines.

It has been previously proposed in United States Patent No. 1,714,948 to form a conduit of an outside pipe and a plurality of hollow cylinders which are closed at their ends and placed in end-to-end abutting relation inside the outside pipe to form a core pipe that conveys high temperature, high pressure elastic fluid. The space between the outside pipe and the core pipe is pressurized by another fluid and the space in each cylinder is vented to communicate with the first-mentioned space. The spaces in the cylinders are filled with insulating material such as "rock wool."

In the pipeline of the present invention the individual spaces of the core pipe are not filled with insulating material such as rock wool but are adapted to contain stagnant gaseous fluid only.

According to the present invention there is provided a pipeline for transmitting high temperature, high pressure gaseous fluid, the pipeline comprising a core pipe within an outside pipe, the core pipe including an inner pipe within and spaced from an outer pipe, the inner pipe serving for conveying the high temperature high pressure gaseous fluid and the space between the outer pipe and the outside pipe serving to receive a fluid for pressurising the core pipe, the annular space between the inner and outer pipes being divided, by partitions spaced along the core pipe, into a number of smaller spaces, wherein each of the smaller spaces is vented so that during transmission of said gaseous fluid the spaces contain stagnant gas only.

For a better understanding of the invention and to show how the same may be carried into effect, reference will now be made to the accompanying drawings, in which:

Figure 1 is a longitudinal sectional view of a part of a pipeline,

Figure 2 is a sectional view of a modified form of a detail of the pipeline of Figure 1, and Figure 3 is a cross-sectional view of a pipeline having the construction shown in Figure 1 and illustrating one method of supporting the core pipe in concentric spaced relation in the outside pipe.

The pipeline is used in a steam installation which employs highly superheated high pressure steam, the temperature of the steam being over 900° F. and the pressure above 700 lbs. per square inch, and which also has available steam which is saturated or of a low degree of superheat, the saturated or low superheat steam being at a pressure which is approximately equal to that of the highly superheated steam.

The pipeline, as illustrated in Figure 1, essentially consists of a number of core pipes 1 and outside pipes 2 approximately concentric with the core pipes. As illustrated in Figure 3, each core pipe 1 may be located and supported in the outside pipe 2 by a number of radially directed lugs 1A which are welded to the core pipe and project therefrom, the free ends of the lugs 1A abutting against the inside surface of the outside pipe 2. The lugs 1A are spaced at equiangular distances around the axis of the pipeline and sets of these lugs may be located at intervals along the pipeline. Each core pipe 1 is of compound construction having an inner pipe 3 of light gauge material surrounded by an outer pipe 4 of light gauge material. Each outside pipe 2 is a relatively thick pipe capable of withstanding the high pressure at a temperature equal to that of steam in the annular space 5 between the core pipes 1 and the outside pipes 2. Each inner pipe 3 has circumferential ribs 6 (Figure 1) spaced along its external surface and the outer pipe 4 is pressed over the circumferential ribs 6. Spaces 7 separated by the ribs 6 are thereby formed between the inner and outer pipes 3, 4 of the core pipes 1. The outer pipes 4 have small holes 8 therethrough for venting purposes so that the pressure in said spaces 7 is equal to that in the annular space 5.

The core pipes 1 are connected to convey the highly superheated steam and the annular space 5 is pressurised by the steam which is saturated or of a low degree of superheat. The compound construction of the core pipes 1 minimises the heat flow by convection from the steam in the core pipes 1 to the steam in the annular space 5. There may be a controlled flow of steam through the annular space 5, the flow control being related to the heat flow through the walls of the compound core pipes 1 from the high temperature steam in the inner-pipe 3, so that the temperature of the outer pipe 4 is maintained approximately equal to the temperature of the steam supplied to the annular space 5.

Since the pressures in said annular space 5 and the core pipes 1 are approximately equal, the spaces 7 may be vented to the core pipes 3 instead of being vented to the annular space 5.

At a joint between two lengths of the compound core pipes 1, each inner pipe 3 terminates adjacent its associated outer pipe 4 and a hoop 6' is inserted between the lengths, one part of the hoop 6' fitting into and closing the end of the annular gap between the inner and outer pipes 3 and 4 of one length, and the opposite part of the hoop 6' fitting similarly into the gap between the inner and outer pipes 3 and 4 of the other length. It will be noted that the hoop 6' also serves a purpose similar to that of the ribs 6 in that it blanks-off the ends of two spaces 7. Each length of the outside pipe 2 has a flange 9 on each end, the flanges having bolt holes for receiving bolts 10 that join adjacent lengths together. A seal 11 is fitted between adjacent lengths.

In an alternative method of joining two lengths of the core pipe 1, one length 1A (Figure 2) is joined to a similar length 1B by swaging out the end portion 12 of the outer pipe 4A of the length 1A and telescoping the outer pipe 4B of the length 1B into the swaged-out portion 12, thus forming an expansion joint. The inner pipe 3A, 3B of each length 1A, 1B terminates sufficiently short of the associated outer pipes 4A, 4B so that an expansion gap 13 is left between the two inner pipes 3A, 3B.

The pipeline described above makes possible the transmission of high temperature high pressure steam without the necessity of using a pipe of very great wall thickness as would be the case if the pipeline merely consisted of a single pipe carrying the high temperature steam.

Furthermore, in the pipeline described above, the core pipes 1 can be made of relatively cheap material, as distinct from expensive alloy steel such as would be necessary if a single pipe were used for conveying the high temperature high pressure steam.

We claim:

1. A pipeline for transmitting high temperature high pressure gaseous fluid, the pipeline comprising an outside pipe, a core pipe within and spaced from the outside pipe, the core pipe including an outer pipe and an inner pipe within and spaced from the outer pipe, the inner pipe serving for conveying the high temperature high pressure gaseous fluid and the space between the outer pipe and the outside pipe serving to receive a high pressure fluid of relatively low temperature compared to that of the high temperature gaseous fluid for pressurizing the core pipe containing the high temperature high pressure gaseous fluid, and partitions in the annular space between the inner and outer pipes of the core pipe spaced along the core pipe for dividing said annular space into smaller spaces, said core pipe being provided with a vent opening for each of said smaller spaces so that said smaller spaces contain stagnant fluid only.

2. A pipeline as claimed in claim 1, wherein the smaller spaces are vented in communication with the interior of the inner pipe of the core pipe.

3. A pipeline as claimed in claim 1, wherein the smaller spaces are vented in communication with the space between the outside pipe and the outer pipe of the core pipe.

4. A pipeline for transmitting high temperature high pressure gaseous fluid, the pipeline comprising an outside pipe, a core pipe within and spaced from the outside pipe, the core pipe including an outer pipe and an inner pipe within and spaced from the outer pipe, the inner pipe serving for conveying the high temperature high pressure gaseuous fluid and the space between the outer pipe and the outside pipe serving to receive a high pressure fluid of relatively low temperature compared to that of the high temperature gaseous fluid for pressurizing the core pipe containing the high temperature high pressure gaseous fluid, the high pressure fluid of relatively low temperature serving to off-set the pressure of the high temperature high pressure gaseous fluid in the core pipe and prevent strain on the core pipe containing said gaseous fluid, said outside pipe having a wall thickness adapted to withstand pressures as high as that of the high temperature high pressure gaseous fluid in the core pipe at the relatively low temperature of the high pressure fluid surrounding the core pipe while the inner and outer pipes of the core pipe have wall thicknesses considerably less than that of the outside pipe, means dividing the annular space between the inner and outer pipes of the core pipe lengthwise of the pipeline into a series of annular spaces, and means for venting each of said series of annular spaces so that they contain stagnant fluid only.

5. A pipeline as claimed in claim 4, in which the inner pipe of the core pipe comprises aligned lengths of piping, the adjacent ends of adjacent lengths of which are spaced apart to provide for expansion and to provide means for venting the space between the inner and outer pipes of the core pipe into the inner pipe of the core pipe.

6. A pipeline for transmitting high temperature high pressure gaseous fluid, the pipeline comprising an outside pipe, a compound core pipe within and spaced from the outside pipe providing an annular flow passageway for a fluid at high pressure and relatively low temperature compared to that of the high temperature gaseous fluid, the core pipe including an outer pipe and an inner pipe within and spaced from the outer pipe thereby providing an annular space for a stagnant fluid, the inner pipe of the compound core pipe providing a separate flow passageway for conveying the high temperature high pressure gaseous fluid, partitions in the annular space between the inner and outer pipes of the compound core pipe spaced along the core pipe for dividing said annular space into a series of annular spaces, and means for venting each of said series of annular spaces into one only of the parts of the pipeline consisting of the inner pipe of the compound core pipe and the annular space between the outside pipe and outer pipe of the compound core pipe so that the series of annular spaces contain stagnant fluid only.

References Cited in the file of this patent

UNITED STATES PATENTS

| | | |
|---|---|---|
| 534,473 | Harvey | Feb. 19, 1895 |
| 675,447 | McMahon | June 4, 1901 |
| 713,787 | McKone | Nov. 18, 1902 |
| 857,096 | McCord | June 18, 1907 |